(12) United States Patent
Seeman et al.

(10) Patent No.: US 10,987,710 B2
(45) Date of Patent: Apr. 27, 2021

(54) THERMAL CONDUCTION HEATER WELL AND ELECTRICAL RESISTANCE HEATING ELECTRODE

(71) Applicant: TRS Group, Inc., Longview, WA (US)

(72) Inventors: Jacob Seeman, Reno, NV (US); Daniel Oberle, Sylvania, OH (US)

(73) Assignee: TRS Group, Inc., Longview, WA (US)

( * ) Notice: Subject to any disclaimer, the term of this patent is extended or adjusted under 35 U.S.C. 154(b) by 10 days.

(21) Appl. No.: 16/962,732

(22) PCT Filed: Feb. 28, 2018

(86) PCT No.: PCT/US2018/020189
§ 371 (c)(1),
(2) Date: Jul. 16, 2020

(87) PCT Pub. No.: WO2019/168520
PCT Pub. Date: Sep. 6, 2019

(65) Prior Publication Data
US 2020/0353520 A1    Nov. 12, 2020

(51) Int. Cl.
*E21B 36/04*    (2006.01)
*B09C 1/06*    (2006.01)

(52) U.S. Cl.
CPC .............. *B09C 1/062* (2013.01); *E21B 36/04* (2013.01)

(58) Field of Classification Search
CPC ...................................... B09C 1/062
See application file for complete search history.

(56) References Cited

U.S. PATENT DOCUMENTS

| | | | |
|---|---|---|---|
| 3,642,066 A * | 2/1972 | Gill | E21B 43/2401 166/248 |
| 5,621,844 A | 4/1997 | Bridges | |
| 5,975,799 A * | 11/1999 | Carrigan | B09C 1/06 166/248 |
| 8,820,406 B2 * | 9/2014 | Harris | E21B 43/2408 166/302 |
| 2003/0173080 A1 | 9/2003 | Berchenko | |
| 2003/0173082 A1 | 9/2003 | Vinegar | |
| 2016/0053596 A1 | 2/2016 | Rey | |

OTHER PUBLICATIONS

International Search Report and Written Opinion dated May 23, 2018 in International Patent Application PCT/US2018/020189.

* cited by examiner

*Primary Examiner* — Janine M Kreck
(74) *Attorney, Agent, or Firm* — Joan T. Kluger; Barnes & Thornburg LLP

(57) ABSTRACT

A combination subsurface heating system that incorporates electrical resistance heating and thermal conduction heating with systems disposed within a single borehole. The combination heating system includes an electrically conductive outermost well casing and a heating element that is electrically isolated from the casing but disposed within it or in an adjacent casing but within the same borehole. Each of the two heating components is powered by a separate power source.

14 Claims, 2 Drawing Sheets

THERMAL CONDUCTION HEATER WELL AND ELECTRICAL RESISTANCE HEATING ELECTRODE

BACKGROUND

Contaminants may be removed from soil, groundwater or rock by subsurface heating using thermal conduction heater wells or electrical resistance heating (ERH) electrodes. Thermal conduction heater wells are heating devices that are typically placed into the ground or soil pile to deliver heat energy into a contaminated media. In most applications, a hole is drilled into the ground to install a metal casing that can accommodate a heating device to transfer heat to the contaminated surroundings. In ERH subsurface electrodes are installed, between which alternating current flows, passing through soil or water. The subsurface media are resistant to the flow of electricity, and therefore, heat is produced. As with ERH, the increased temperature may cause a phase change, enabling removal of volatile contaminants. If both methods are employed simultaneously at a single site, each is performed in a separate bore hole location.

Combining thermal conduction heating with ERH may more efficiently treat subsurface contamination, particularly for sites containing a subsurface media with a substantially different electrical conductivity or thermal conductivity than the subsurface media overlying or underlying it.

Using conventional procedures, two different bore holes are installed to separately treat upper and lower lithological units of highly different electrical conductivity or thermal conductivity values. This may be done in lithologies of differing electrical conductivity by installing two different bore holes for ERH electrodes and applying different voltage potentials to the two different electrodes targeting the differing lithologies proportional to their resistivity, or by using a conductive heating well in a less electrically conductive media (such as a metamorphic or igneous bedrock) and ERH in a more electrically conductive media (such as an overlying saturated soil). Using two different bore holes doubles the cost of drilling during installation efforts.

SUMMARY

A combination subsurface heating system is disclosed that incorporates electrical resistance heating (ERH) and thermal conduction heating in the same borehole. The combination heating system includes an electrically conductive well casing and a heating element that is electrically isolated from the casing. Each of the two heating components is powered by a separate power source. The heating element may be placed within the conductive casing or within an adjacent casing placed within the same borehole. The position of the heating element within the electrically conductive casing in which it is disposed may be chosen or adjusted along the length of the casing. The heating element is disposed within one of the electrically conductive casings so that only one borehole is required to accommodate both heating applications.

DESCRIPTION OF THE DRAWING

The detailed description refers to the accompanying figure, which depicts an illustrative embodiment.

DETAILED DESCRIPTION OF EMBODIMENTS

Embodiments of a subsurface heating system are disclosed having an electrically conductive casing induced with a voltage potential, and a heating element that is electrically isolated from the casing. The heating element is placed inside the energized casing, or within an adjacent casing located within the same boring, and is powered by a separate power source. The heating element may be positioned at a level within one of the casings or an adjacent casing to provide a desired heat intensity to target contaminants at a particular subsurface interval.

The figures and descriptions provided herein are all of illustrative embodiments and may have been simplified to illustrate aspects that are relevant for an understanding of the described devices, systems and methods, while eliminating, for the purpose of clarity, other aspects that may be found in typical devices, systems and methods. Those of ordinary skill in the art may recognize that other elements or operations may be desirable or necessary to implement the devices, systems and methods described herein. Because such elements and operations are well known in the art, and because they do not facilitate a better understanding of the present disclosure, a discussion of such elements and operations may not be provided herein. However, this disclosure is deemed to inherently include all such elements, variations and modifications to the described aspects that could be implemented by those of ordinary skill in the art.

Figure 1:
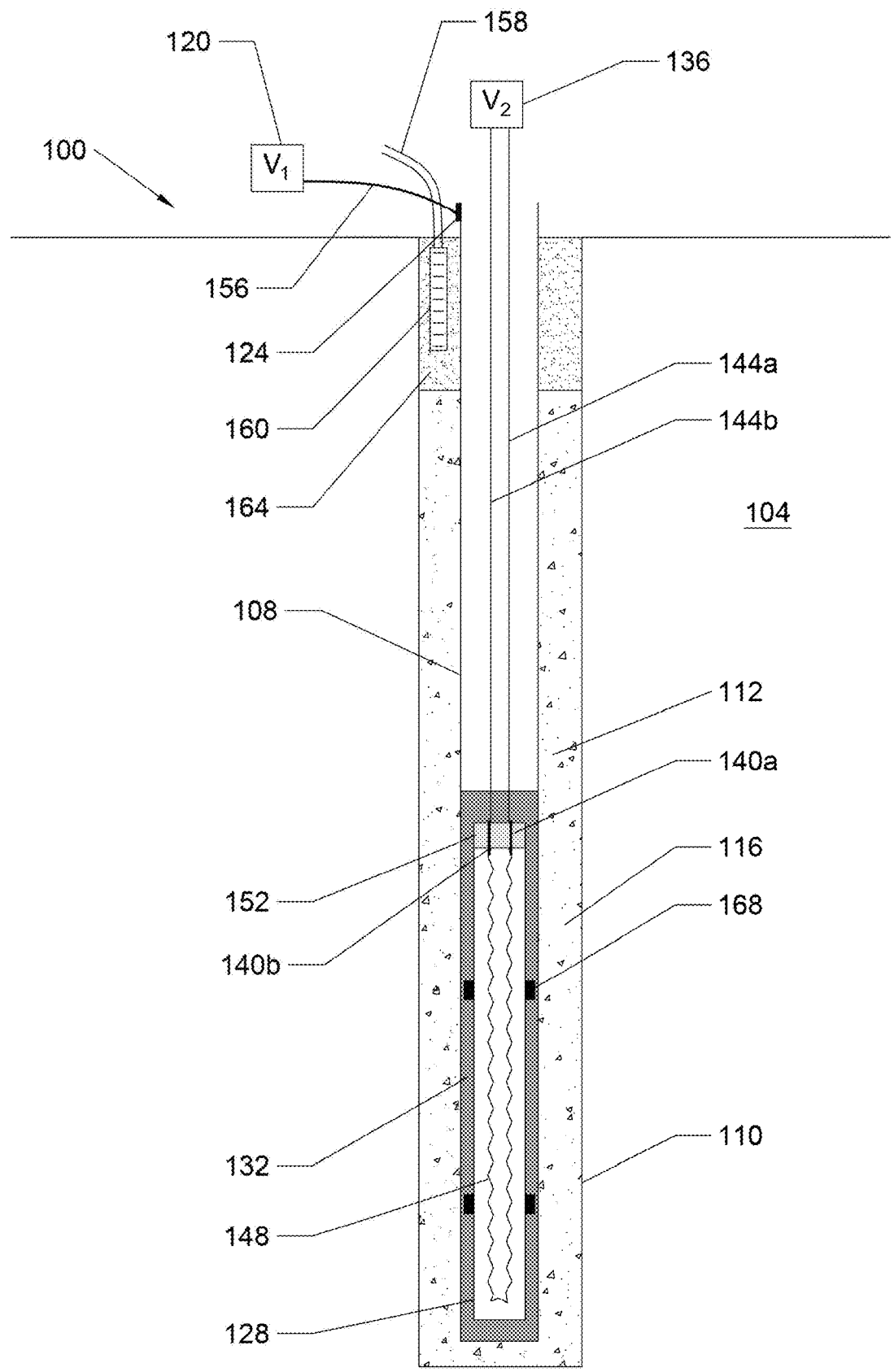
FIG. 1 depicts a heater well having an electrically conductive casing and an internal heating element placed within the electrically conductive casing.

FIG. 1 is a schematic of an illustrative embodiment of a heater well 100. A borehole 110 is installed into the subsurface 104, typically by standard drilling and boring techniques. The boring technique selected may depend, at least in part, on the type of subsurface material and the size of an electrically conductive casing 108 to be inserted within a borehole 110. Electrically conductive casing 108 is constructed of an electrically conductive material, such as iron or stainless steel, for example. Borehole 110 is larger than the outer diameter of electrically conductive casing 108, leaving a space 112 therebetween. Space 112 will be referred to as an annular space, but may be other shapes, depending on the shape of electrically conductive casing 108 and borehole 110. Annular space 112 may be filled with an electrically conductive medium 116, such as coke breeze, conductive carbon grout, graphite or metal shot, for example. In an illustrative example, conductive medium 116 has a conductivity value in the range of 1,000 to 1,000,000 Siemens/meter.

A first power source 120, denoted as $V_1$, is connected to electrically conductive casing 108 by a fastener 124. Fastener 124 may be, for example, a brazed or welded connection or lug connection. A second power source 136, denoted $V_2$, provides power to an internal heating element 128. Internal heating element 128 is placed within electrically conductive casing 108. In an illustrative embodiment, a cartridge heater is used, however, any type of heater that provides the desired heat intensity and can withstand and operate in the environment into which it is placed, may be used. Thermally conductive spacers 168, such as small concrete or glass blocks, may be adhered to the outside of internal heating element 128 to centralize or stabilize its placement within casing 108.

A thermally conductive fill 132 is placed inside electrically conductive casing 108 to surround internal heating element 128. Thermally conductive fill 132 is inserted either before or after installation of internal heating element 128. In an illustrative embodiment, thermally conductive fill 132 comprises a grout mixture prepared with enhanced thermally conductive properties. Thermally conductive fill 132 facilitates heat transfer away from internal heating element 128 during heating. An illustrative thermally conductive fill 132 has a thermal conductivity in the range of 0.2 watts to 5.0 watts per meter-Kelvin (W/m K). In one embodiment, thermally conductive fill 132 is comprised of a cement grout containing a mixture of silica sand (25% to 50% by weight), Portland cement (20% to 40% by weight), bentonite powder (0 to 15% by weight) and water (20% to 35% by weight). In an exemplary embodiment, thermally conductive fill 132 completely covers internal heating element 128, but does not necessarily completely fill electrically conductive casing 108. Any of the aforementioned components of thermally conductive fill 132 can be substituted with materials of similar qualities and compatibility with the other thermally conductive fill 132 materials, the environment and function of heater well 100.

Second power source 136 is connected to pins 140a, 140b using high temperature wires 144a, 144b. High temperature wires 144a, 144b may be, for example, Teflon-insulated nickel wire. Pins 140a, 140b, illustratively are constructed of nickel, or other conductive material to withstand the temperature to which they will be subjected to during heating processes. Pins 140a, 140b are located inside internal heating element 128 and connect to a resistive heater wire 148 inside internal heating element 128. Pins 140a, 140b are surrounded by a seal 152, comprised of epoxy or other high temperature, electrically-insulating sealant, at the top of internal heating element 128 to create a water-proof seal around pins 140a, 140b. In an illustrative embodiment, seal 152 is 100 to 300 millimeters thick. Generally, seal 152 should prevent water penetration to or current leakage from inside internal heating element 128. The integrity of seal 152 may be tested by submitting internal heating element 128 to a HiPot test involving a four-hour submersion in water while subjecting internal heater wire 148 to a 1,440 voltage differential and measuring to ensure that the current leakage from inside internal heating element 128 to outside internal heating element 128 is less than 3 milliamps Other sealing mechanisms, materials and components may be employed to meet required prevention of water penetration and current leakage, under the process conditions.

In an illustrative procedure, electrically conductive casing 108 is supplied with a voltage potential from first power source 120 by an electrical cable 156 while internal heating element 128 is supplied with power from the voltage differential at second power source 136 so that heating occurs at one site location by means of conductive heating from internal heating element 128 and electrical resistance heating from electrically conductive casing 108. The two types of heating may take place concurrently or serially, or a combination thereof. The voltage applied from first power source 120 may be, for example, from a set of isolation transformers. In an illustrative embodiment, two or more electrically conductive casings 108 are installed. Electrically conductive casings 108 may be at different voltage potentials so that current can flow from the electrically conductive casing, through electrically conductive medium 116 and then through the subsurface medium to be treated, to a second electrically conductive casing that has a different voltage potential applied from first power source 120. Any second component that produces the voltage potential difference may be employed, although for subsurface remediation a second heater well will typically be most advantageous. It is noted that heater wells 100 can be set up in a 'grid' with only other same type heater wells, or with different types of heater wells, provided that, where necessary, a voltage potential difference is created.

In an environmental remediation heating system and method, electrically conductive medium 116 in annular space 112 of borehole 110 may also be permeable, and therefore, will allow gases such as steam and volatilized contaminants to move through it for vapor capture. A screen 160 is placed within borehole 110. The portion of annular space 112 surrounding screen 160 may be filled with electrically insulating material 164, such as sand for example, instead of an electrically conductive medium. Electrically insulating material 164 helps to electrically insulate screen 160 from its surroundings. The function of screen 160 is to allow for recovery of vapor phase contaminants, steam and air during heating of the subsurface. Screen 160 may instead be placed directly within the subsurface 104 outside of borehole 110 instead of inside borehole 110. Placing screen 160 within borehole 110 may reduce the amount of drilling required and allow for capture of vapors at the location of highest steam production. However, if an impermeable conductive media, such as conductive carbon grout, is used as the electrically conductive media 116, then screen 160 may need to be placed outside of borehole 110. Screen 160 is connected to a vapor transport manifold 158, which may consist of pipe or hose, for example. A vacuum blower (not shown) can be functionally connected to vapor transport manifold 158 to supply the vacuum to the vapor transport manifold. Contaminants are heated in a treating area around the environmental remediation heating system and removed by action of the vacuum after entering annular space 112 or being remediated by the heat in place. The treating area is any area around heater well 100 that is remediated in part or in whole by the heating system.

Thermally conductive medium 132 transfers heat produced by resistance heater wire 148 to electrically conductive casing 108. First power source 120 applies a voltage potential across resistance heater wire 148 and second power source 136 delivers current to electrically conductive casing 108. This allows targeted power delivery within subsurface 104 in situations in which more heat is needed in a specific soil volume.

Internal heating element 128 may be selectively placed at any location within electrically conductive casing 108 to produce a desired heat intensity at a targeted interval along the heater well depth. It is noted that a heater well or electrically conductive casing 108 need not be installed vertically, so that "depth" refers to the distance from the opening of electrically conductive casing 108 extending into it. FIG. 1 shows internal heating element 128 at the bottom of the electrically conductive casing 108 to target a fractured bedrock system, for example. In a fractured bedrock system, internal heating element 128 preferentially supplies heat to the bedrock by conductive heating while heat generated by ERH preferentially supplies heating to groundwater in the fractures of the bedrock, thus potentially providing a better overall heating system than either technology provides on its own. Internal heating element 128 may also be installed at a site that has variations in lithological units. For example, internal heating element 128 may be installed in alternating clay and sand lithological units with a high groundwater flow through the sand interval, which typically requires more heat input. The remediation method may involve placing internal heating element 128 across the sandy interval to deliver extra heat to that lithological unit to help heat fast-flowing groundwater, or it could be placed near ground surface to overcome heat-loss to the surface.

In an illustrative embodiment internal heating element 128 is selected so the voltage potential on electrically conductive casing 108 and the voltage differential across resistive heater wire 148 in internal heating element 128 create a potential that will not produce an electrical short-circuit between points of differing voltage potential, but will serve to provide the desired heat intensity. For example, a voltage differential of 120 to 480 volts may be applied to resistive heater wire 148 while simultaneously applying a phase-to-neutral voltage differential of 400 volts to electrically conductive casing 108.

The voltage differential applied by first power source (VD) 120 to electrically conductive casing 108 may range from as low as 20 volts phase-to-neutral for subsurface media having a high electrical conductivity (such as saturated sand containing salty groundwater) to as high as 600 volts phase-to-neutral for subsurface media having a low electrical conductivity (such as a weathered limestone or dolomite bedrock). In the most common applications, the phase-to-neutral voltage will be in the range of 40 to 250 volts phase-to-neutral.

Depending on the size and length of resistive heater wire 148, the voltage differential applied by the second power source ($V_2$) 136 for internal heating element 128 may range from 25 volts (for a large diameter resistive wire) to 600 volts (for a small diameter resistive wire). In the most common application, the voltage differential from the second power source ($V_2$) 136 will be in the range of 120 to 480 volts to adapt to readily available power supplies.

Heater well 100 may be employed to remediate a variety of contaminants. In an illustrative embodiment, a hole is bored into the ground, for example by a drill rig. Electrical conductive casing 108 is installed into the hole. Additionally, internal heating element 128 is situated in electrical conductive casing 108. Separate voltage sources are electrically connected to electrical conductive casing 108 and internal heating element 128. Fill media as described herein, for example, is inserted into heater well 100. Heat from internal heating element 128 and/or created by ERH is transferred to the contaminated surroundings. The heat may volatilize contaminants in the soil by increasing the vapor pressure of the contaminants Typical contaminants volatilized by heating with this process are listed in the analyte list provided in United States Environmental Protection Agency's SW-846 test methods 8260 and 8270, which include over 150 contaminants. The most common contaminants treated with thermal remediation include, but are not limited to, tetrachloroethene, trichloroethene, trichloroethane, dichloroethenes, dichloroethanes, methylene chloride, carbon tetrachloride, chloroform, vinyl chloride, chlorobenzenes, benzene, toluene, ethylbenzene, xylenes and various fuel mixtures. In other applications, the heat may increase the temperature of groundwater to enhance aqueous-based chemical reactions which destroy the contaminants in place. Contaminants commonly destroyed by heated aqueous-based chemical reactions include halogenated alkanes and a number of pesticides. For compounds that have low volatility, high temperatures may be applied by the heater well to chemically break down the molecular structure of the contaminants. For example, many of the polycyclic constituents in coal tar or heterocyclic compounds like trinitrotoluene or dioxins will self-degrade at high temperatures.

Typically, a series of heater wells will be installed in a contaminated area, for example in a grid pattern to effectively heat the site area.

Materials and configurations of illustrative embodiments will now be described in more detail. Internal heating element 128 comprises an outer, cylindrical sheath constructed from a corrosion-resistant alloy such as stainless steel. An electrically-insulating mineral powder with a high thermal conductivity that is tolerant to very high temperatures, for example magnesium oxide, is placed within the cylindrical sheath to surround an internal heating wire, such as resistive heater wire 148 shown in FIG. 1, which is within the cylindrical sheath. Resistive heater wire 148 may be constructed of a high resistance wire such as NiChrome or other resistive alloy, typically an alloy containing a high amount of nickel. Power is delivered to resistive heater wire 148 by a high-temperature wire 144a, such as a Teflon insulated wire. Pins 140a, 140b are located at the top of the internal heating element to deliver power from the Teflon-insulated wire 144a to resistive heater wire 148 within the magnesium oxide filled cylindrical sheath. Pins 140a, 140b are constructed of an alloy that can withstand high temperatures such as nickel. Pins 140a, 140b are surrounded by a potting seal, such as epoxy, to create a seal to prevent moisture or air from entering the cylindrical sheath around the pins.

There are significant challenges in applying two different sources of power to a single borehole to operate both technologies simultaneously or from the same borehole. For example, shorting or arcing between the differing voltage sources may occur. Configurations of the disclosed combination subsurface heating system may provide a means of performing both treatments simultaneously without shorting between the voltage sources.

The disclosed combination heating system may be more easily installed than conventional heating systems. Additionally, it can be installed in stages if needed or desired. For example, internal heating element 128 can be installed after it is known that more heat is needed in a given soil volume due to unforeseen subsurface conditions. Thus, heating may be optimized at a single borehole location using both types of heating technologies in a single heater casing. Internal heating element 128 may also be repositioned as needed to target contaminants at different location intervals and different types of contaminants. The ability to change the internal heating element 128 location within the electrically conductive casing 108 may be referred to as "adjustability" or "selectivity". Changes will typically be performed during interruptions in the remediation process, but may also be performed during such procedures as when the electrically conductive casing is electrically deactivated. In an illustrative embodiment, to allow for adjustability, internal heating element 128 is installed inside electrically conductive casing 108 without the use of thermally conductive fill 132. In this application, the space between the inside diameter of electrically conductive casing 108 and the outside diameter of internal heating element 128 is minimized to reduce the insulating effect of the gap between the two, and the operating power of internal heating element 128 is also reduced. For example, with the use of thermally conductive fill 132, the internal heating element 128 may operate in the range of 5 to 15 watts per centimeter (lengthwise) of heating element, whereas in the adjustable design the internal heating element 128 may, in an illustrative embodiment, be operated in the range of 3 to 7 watts per linear centimeter of heating element to compensate for the insulating effect of the gap. The gap in the adjustable design may be filled with air, but in an exemplary embodiment, it is filled with an oil rated for high temperatures such as a high temperature oil such as silicone transformer oils, high temperature mineral oil, molybdenum bisulphate oil or ester-based fluid lubricants which may be used at temperatures in the range of 100° C. to 550° C. In an illustrative embodiment, the gap between the closest points of the electrically conductive casing and the internal heating element may be about 5 millimeters when placed inside a 40-millimeter diameter casing, but the gap may be as wide as 145 millimeters for heaters placed inside a casing with a diameter as large as 300 millimeters. Illustrative gap ranges are 4 millimeters to 6 millimeters for a 40 millimeter diameter pipe and 135 millimeters to 150 millimeters for a 300 millimeter pipe. In an illustrative embodiment, a gap of about 0.9-1.1 inches is used when employing a two inch schedule pipe and a ¼ inch diameter cartridge heater.

Figure 2:
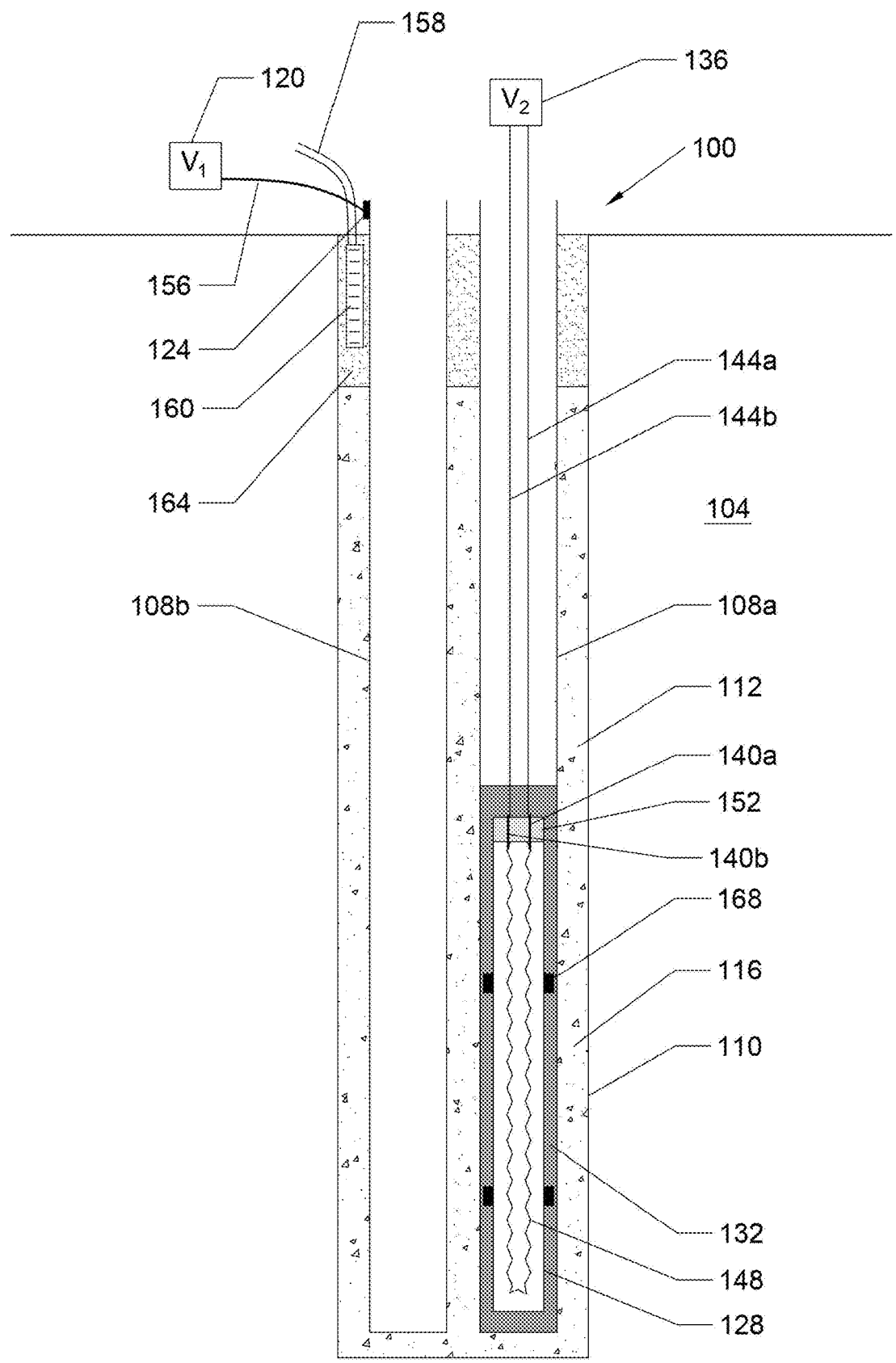
FIG. 2 depicts a heater well having two casings in a single borehole, at least one of which is electrically conductive and used for ERH, with a second casing used to house a heating element.

FIG. 2 is a schematic of an illustrative embodiment of a heater well 100 with two electrically conductive casings 108a, 108b. Although two electrically conductive casings are shown, it should be understood that additional casings may be installed inside borehole 110 provided they fit within borehole 110 and electrical resistance heating and thermal conduction heating can effectively be implemented. Additionally, a casing used for thermal conduction heating need not be conductive. Therefore, although casings will be referred to as "electrically conductive casings" it will be understood that non-conductive casings can be substituted for those having internal heating elements within. In the illustrated embodiment of FIG. 2, one electrically conductive casing 108a is energized by first power source ($V_1$) 120 while a second electrically conductive casing 108b houses an internal heating element 128 to target heating at a specific depth interval. The heater well 100 illustrated in FIG. 2 provides redundancy by allowing electrically conductive casing 108a, 108b to be used for ERH or thermal conductive heating. If internal heating element 128 in electrically conductive casing 108b were to fail during the middle of a remediation project, then a replacement may be relatively easily installed inside electrically conductive casing 108a, possibly with very little system down-time. Similarly, ERH performance may be enhanced, if necessary, by connecting first power source ($V_1$) 120 to both electrically conductive casings 108a and 108b.

To effectuate ERH, one or more additional electrically conductive casings 108 are installed in one or more additional boreholes 110 at a distance from the first borehole 110. A potential difference is created between the electrically conductive casings 108 in different boreholes 110 to produce heat in subsurface soil, water or bedrock. To effectuate thermal conduction heating, an internal heating element 128 is placed in any of the one or more casings 108 or in casings adjacent to the ERH casings 108 within the same borehole 110. Various combinations of one or more ERH casings 108 and one or more internal heating elements 128 may be used to remediate contaminants at various subsurface levels.

Various embodiments of the combination heating system and method have been described, each having a different combination of elements. The invention is not limited to the specific embodiments disclosed, and may include different combinations of the elements disclosed, omission of some elements or the replacement of elements by the equivalents of such structures.

Various quantities and specifications have been designated for illustrative embodiments. Each quantity is considered to include at least an amount of measurement error. Each quantity and specification is considered to reasonably encompassed amounts under the doctrine of equivalents, provided, for example, that the application of the component, step or system will produce the intended remediation effect.

While illustrative embodiments have been described, additional advantages and modifications will occur to those skilled in the art. Therefore, the invention in its broader aspects is not limited to specific details shown and described herein. Accordingly, it is intended that the invention not be limited to the specific illustrative embodiments, but be interpreted within the full spirit and scope of the appended claims and their equivalents.

The invention claimed is:

1. A heating system comprising:
an electrically conductive casing disposed within a subsurface hole;
an internal heating element disposed within the electrically conductive casing;
an electrically conductive medium disposed around the electrically conductive casing;
the electrically conductive casing configured to be powered by a first power source through a single electrical cable; and
the internal heating element configured to be powered by a second power source connected to the internal heating element via two high-temperature wires, wherein the second power source is electrically isolated from conductive connection to the first power source.

2. The heating system of claim 1 further comprising a thermally conductive medium disposed between the internal heating element and the electrically conductive casing.

3. The heating system of claim 1 wherein the position of the internal heating element is adjustable within the electrically conductive casing to produce a desired heat intensity at a targeted interval.

4. The heating system of claim 1 comprising a gap between the electrically conductive casing and the internal heating element, wherein the gap between the closest points of the electrically conductive casing and the internal heating element is in the range of 5 millimeters to about 145 millimeters.

5. The heating system of claim 1 wherein the thermally conductive medium has a thermal conductivity in the range of 0.2 watts per meter-Kelvin to 5.0 watts per meter-Kelvin.

6. The heating system of claim 1 further comprising electrically insulating material disposed around the electrically conductive casing at a position above the electrically conductive medium.

7. The heating system of claim 1 wherein the internal heating element is a cartridge heater.

8. A heating system comprising:
two or more casings disposed within a single subsurface hole, at least one of which is conductive;
an internal heating element disposed within at least one of the two or more casings;
an electrically conductive medium disposed around the at least one electrically conductive casing;
the at least one electrically conductive casing configured to be powered by a first power source each through a single electrical cable; and
the internal heating element configured to be powered by a second power source connected to the internal heating element via two high-temperature wires, wherein the second power source is electrically isolated from conductive connection to the first power source.

9. The heating system of claim 8 further comprising a thermally conductive medium between the internal heating element and the casing in which it is disposed.

10. The heating system of claim 8 wherein the position of the internal heating element is adjustable within the casing to produce a desired heat intensity at a targeted interval.

11. The heating system of claim 8 wherein the internal heating element is in an electrically conductive casing further comprising:
   a gap between the casing and the internal heating element, wherein the gap between the closest points of the electrically conductive casing and the internal heating element is in the range of 5 millimeters to about 145 millimeters.

12. The heating system of claim 9 wherein the thermally conductive medium has a thermal conductivity in the range of 0.2 watts per meter-Kelvin to 5.0 watts per meter-Kelvin.

13. The heating system of claim 8 further comprising electrically insulating material disposed around the electrically conductive casing at a position above the electrically conductive medium.

14. The heating system of claim 8 wherein the internal heating element is a cartridge heater.

\* \* \* \* \*